United States Patent
Sohn et al.

(10) Patent No.: US 8,310,954 B2
(45) Date of Patent: Nov. 13, 2012

(54) APPARATUS AND METHOD FOR IDENTIFYING NETWORK CONNECTION STATUS IN PORTABLE TERMINAL

(75) Inventors: Chang-Ho Sohn, Gyeonggi-do (KR); Jong-Mu Choi, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 259 days.

(21) Appl. No.: 12/765,079

(22) Filed: Apr. 22, 2010

(65) Prior Publication Data

US 2010/0271977 A1    Oct. 28, 2010

(30) Foreign Application Priority Data

Apr. 22, 2009   (KR) ................. 10-2009-0034900

(51) Int. Cl.
*H04L 12/28* (2006.01)
(52) U.S. Cl. .................. 370/254; 370/255; 370/388
(58) Field of Classification Search ................. 370/254, 370/395.4, 388; 714/748; 455/418
See application file for complete search history.

(56) References Cited

U.S. PATENT DOCUMENTS

| | | | | |
|---|---|---|---|---|
| 6,493,342 | B1* | 12/2002 | Breslow et al. | 370/394 |
| 7,864,757 | B2* | 1/2011 | Hall et al. | 370/388 |
| 2004/0006732 | A1* | 1/2004 | Lundby | 714/748 |
| 2006/0034285 | A1* | 2/2006 | Pirskanen et al. | 370/394 |
| 2007/0238452 | A1* | 10/2007 | Haviala | 455/418 |
| 2008/0120402 | A1* | 5/2008 | Brown | 709/223 |
| 2010/0172336 | A1* | 7/2010 | Pehrsson et al. | 370/338 |

\* cited by examiner

*Primary Examiner* — Robert Wilson
*Assistant Examiner* — Mewale Ambaye
(74) *Attorney, Agent, or Firm* — Cha & Reiter, LLC

(57) ABSTRACT

An apparatus and method for decreasing the number of bearer connections by transmitting a data packet in order to determine a network connection status at a time of bearer connection necessarily performed by a portable terminal together with a location registration message. Reduced battery consumption in the portable terminal is achieved because of the reduced number of bearer connections. The apparatus includes a transmission time determination unit for reconfiguring a data packet transmission time to a time of bearer connection necessarily performed by the portable terminal when a data packet is transmitted to determine the network connection status, and a controller for providing control to transmit the data packet is transmitted while connecting the bearer at the reconfigured data packet transmission time, wherein the reconfigured data packet transmission time may be advanced or delayed of the initial transmission time.

20 Claims, 4 Drawing Sheets

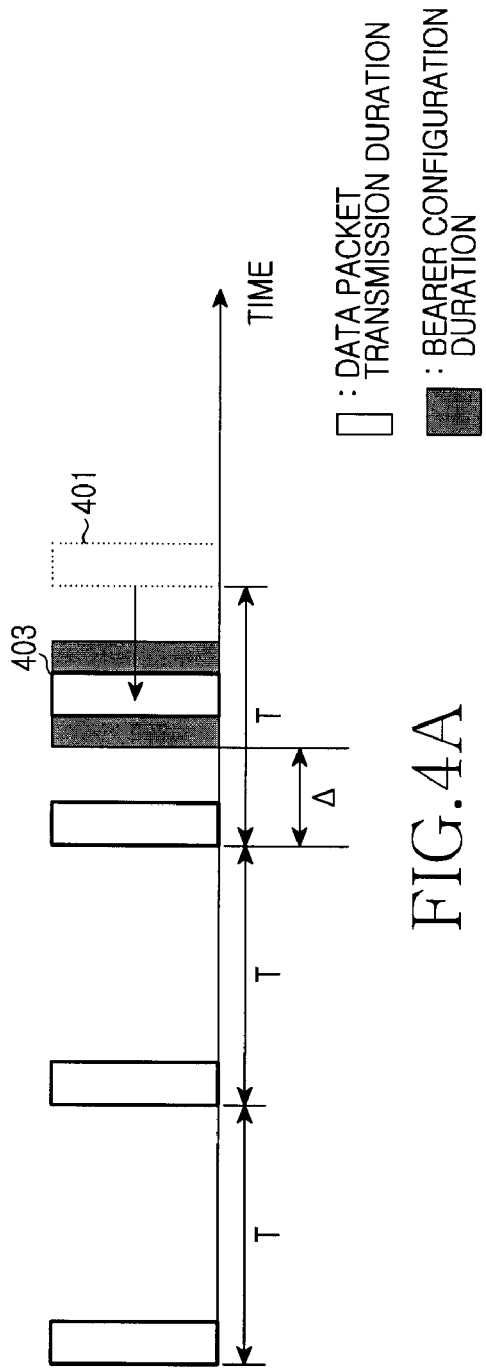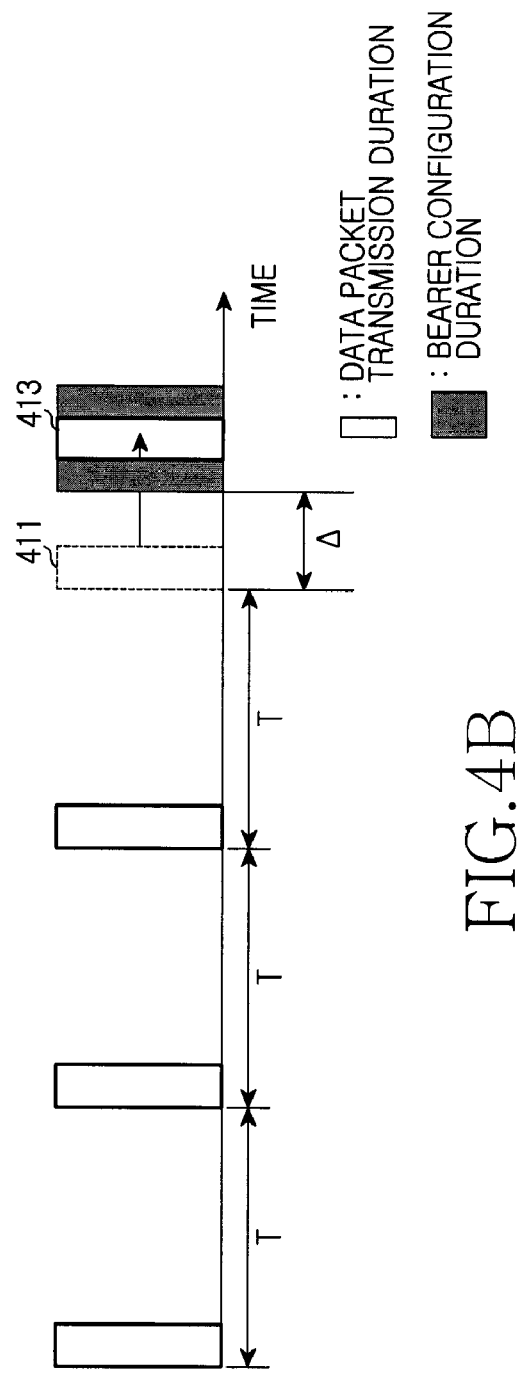

APPARATUS AND METHOD FOR IDENTIFYING NETWORK CONNECTION STATUS IN PORTABLE TERMINAL

CLAIM OF PRIORITY

This application claims the benefit of priority under 35 U.S.C. §119(a) from a Korean patent application filed in the Korean Intellectual Property Office on "Apr. 22, 2009" and assigned Serial No. "10-2009-0034900", the entire disclosure of which is hereby incorporated by reference in its entirety.

BACKGROUND OF THE INVENTION

1. Field of the Invention

The present invention relates to an apparatus and method for reducing battery consumption when a data packet necessary to identify a network connection status is periodically transmitted in a portable terminal. More particularly, the present invention relates to an apparatus and method for decreasing the number of bearer connections and thus for reducing battery consumption in the portable terminal.

2. Description of the Related Art

Recently, with the rapid development of portable terminals, a mobile phone providing wireless voice call and data exchange is regarded as personal necessity of life. Conventional portable terminals have generally been regarded as portable devices providing wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions that has made such devices become a source of many types of entertainment, such as watching a satellite broadcasting program, games, remote controlling using near field communication, a user position tracking, etc.

When an instant messenger, a push e-mail client, or the like is installed, the portable terminal periodically transmits a keep-alive packet called a "heartbeat" to a server, even if a specific service is not being used, and thus reports that the terminal is connected for a specific service.

That is, when a program for at least one the aforementioned services is installed, the portable terminal operates whereby a heartbeat or a ping message is periodically transmitted to the server to report that the terminal is connected to an Internet Protocol (IP) network. Thus, upon receiving the heartbeat message, the server regards that the portable terminal is connected to the IP network during a time interval included in the message.

The aforementioned method of operation can be summarized as follows.

First, the portable terminal transmits the heartbeat or ping message to the server to report that the terminal is connected to the network. When transmitting the message, the portable terminal allows the message to include predicted time information indicating a time at which the terminal can be connected again to the network. Accordingly, the server transmits a response to the heartbeat or ping message from the portable after the elapse of the time information (i.e., the predicted time).

If a problem (e.g., gateway, proxy, packet loss, and the like) occurs on the network, and thus the response from the server is not transmitted to the portable terminal, the portable terminal then determines that the predicted time is too long, and thus transmits another heartbeat including information of a shortened time to the server. That is, the portable terminal performs a process of shortening the predicted time until a response is received from the server.

Thereafter, if the response to the message is received from the server, the portable terminal performs a process of periodically transmitting the heartbeat message to the server while maintaining the predicted time interval.

The portable terminal also performs a bearer connection, which provides the capability for information transfer between access points and the characteristics of which can be negotiated and renegotiated at a connection establishment and during an ongoing session, even in an idle situation where no traffic exists, and thereafter transmits the heartbeat message to the server. As a result, instantaneous current consumption occurs in the portable terminal, and thus when the heartbeat message is transmitted periodically by the portable terminal, battery consumption increases. Accordingly, there is a problem in that the operation time of the portable terminal is shortened due to decreased battery consumption.

SUMMARY OF THE INVENTION

An exemplary aspect of the present invention is to provide an apparatus and method for reducing battery consumption caused by repeated heartbeat transmissions in a portable terminal.

Another exemplary aspect of the present invention is to provide an apparatus and method for reducing battery consumption by transmitting a heartbeat at a time of configuring a bearer to transmit a Location Area Update (LAU) or a Routing Area Update (RAU) in a portable terminal.

Still another exemplary aspect of the present invention is to provide an apparatus and method for reconfiguring a heartbeat transmission time to a time of configuring a bearer in a portable terminal.

In accordance with an exemplary aspect of the present invention, an apparatus for determining a network connection status in a portable terminal is provided. The apparatus preferably includes a transmission time determination unit for reconfiguring a data packet transmission time to a time of a bearer connection necessarily performed by the portable terminal when a data packet is transmitted to determine the network connection status, and a controller for providing control such that the data packet is transmitted while connecting the bearer at the reconfigured data packet transmission time.

In accordance with another exemplary aspect of the present invention, a method of determining a network connection in a portable terminal is provided. The method includes reconfiguring a data packet transmission time of an additional data packet to correspond to of a time of bearer connection performed by the portable terminal when a bear connecting data packet such as in a Location Area Update (LAU) or a Routing Area Update (RAU) is transmitted to determine the network connection status, and transmitting the data packet while connecting the bearer at the reconfigured data packet transmission time.

Other exemplary aspects, advantages and salient features of the invention will become more apparent to a person of ordinary skill in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be more apparent from the following detailed description taken in conjunction with the accompanying drawings, in which:

FIG. 4A is a graphical illustration of a process of advancing a time of transmitting a data packet in a portable terminal according to an exemplary embodiment of the present invention; and FIG. 4B is a graphical illustration of a process of delaying a time of transmitting a data packet in a portable terminal according to an exemplary embodiment of the present invention.

DETAILED DESCRIPTION

The following description, with reference to the accompanying drawings, is provided to assist a person of ordinary skill in the art with a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Also, descriptions of well-known functions and constructions may be omitted for clarity and conciseness when their inclusion may obscure appreciation of the subject matter of the claimed invention by a person or ordinary skill in the art.

The terms and words used in the following description and claims are not limited to the bibliographical meanings, but are used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes a reference to one or more of such surfaces unless otherwise specified. The term "substantially" as used in this application means that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The present invention described below relates to an apparatus and method for decreasing the number of bearer connections by transmitting a data packet used for determining a network connection status at a time the bearer connection is performed by a portable terminal together with a location registration message and thus for solving/reducing a battery consumption problem in the portable terminal.

Figure 1:
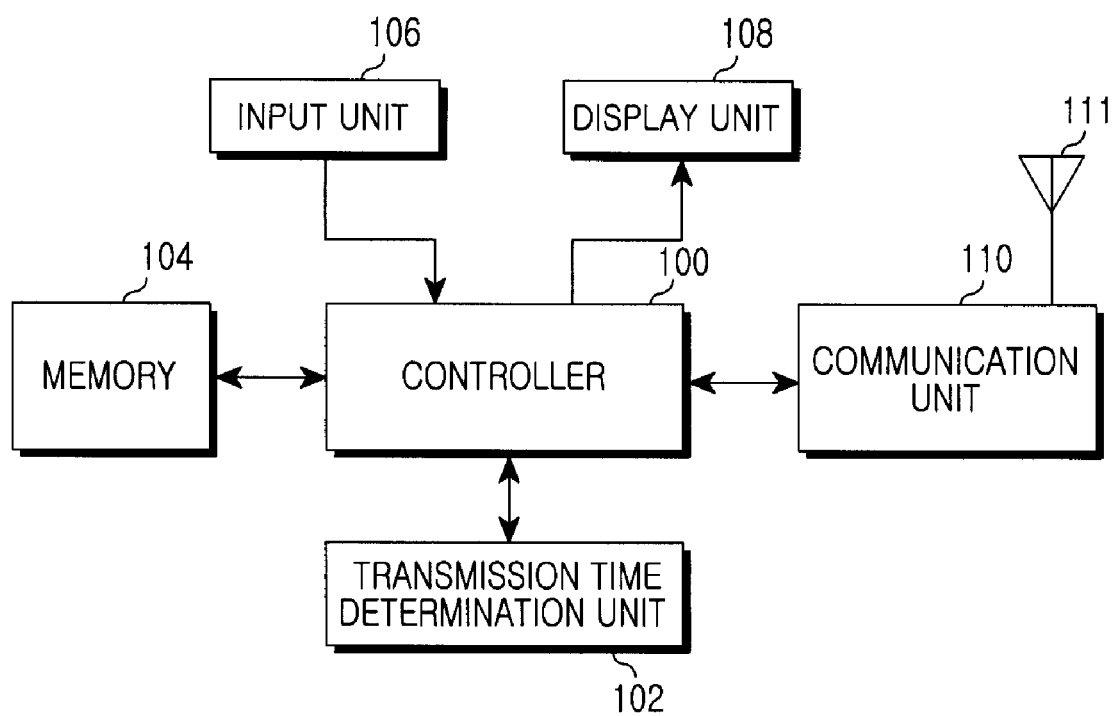
FIG. 1 is a block diagram illustrating a structure of a portable terminal for solving a battery consumption problem according to an exemplary embodiment of the present invention.

FIG. 1 is a block diagram illustrating a structure of a portable terminal for solving/reducing a battery consumption problem according to an exemplary embodiment of the present invention.

Referring now to FIG. 1, an exemplary portable terminal according to the present invention preferably includes a controller 100, a transmission time determination unit 102, a memory 104, an input unit 106, a display unit 108, and a communication unit 110.

The controller 100 provides overall control to the portable terminal. For example, the controller 100 processes and controls voice calls and data communications, and in addition to its typical function, the controller 100 of the present invention allows a data packet used to determine a network connection status at a time of a bear connection necessarily performed in the portable terminal to be transmitted together with a location registration message, so as to reduce battery consumption when transmitting the data packet necessary to determine the network connection status.

The controller 100 allows the transmission time determination unit 102 to reconfigure a transmission time of a data packet necessary to determine the network connection status at a time during which the bearer connection is performed. In other words, the controller 100 provides control such that the operations of a bearer connection process are reduced by transmitting the data packet in a process of bearer connection for transmitting an LAU or an RAU. This action solves a problem of increased battery consumption when the bearer connection is periodically performed to transmit a data packet (e.g., heartbeat or ping) in a periodic manner to a server in order to report that the portable terminal is connected to an Internet Protocol (IP) network.

Under the instruction of the controller 100, the transmission time determination unit 102 predicts a time of bearer connection necessarily performed together with the bearer connection for transmitting the LAU or the RAU before transmission of the data packet.

The transmission time determination unit 102 reconfigures the data packet transmission time according to the predicted time.

The memory 104 includes, for example, a Read Only Memory (ROM), a Random Access Memory (RAM), a flash ROM, and the like. The ROM preferably stores a microcode of a program, by which the controller 100 and the transmission time determination unit 102 are processed and controlled, and a variety of reference data.

The RAM is a volatile working memory of the controller 100 and stores temporary data that is generated while programs are operating. The flash ROM stores a variety of rewritable data, such as phonebook entries, outgoing messages, incoming messages, and the like.

The input unit 106 preferably includes a plurality of function keys such as numeral key buttons of '0' to '9', a menu button, a cancel button, an OK button, a talk button, an end button, an Internet access button, a navigation (or a direction) key button, a character input key, and the like. Key input data (e.g., a network connection request), which is input when a user presses these keys, is provided to the controller 100.

The display unit 108 displays information such as status information, which is generated while the portable terminal operates, moving and still pictures, and the like. The display unit 108 may be a color Liquid Crystal Display (LCD), Active Mode Organic Light Emitting Diode (AMOLED), and the like, or any type of thin film technology display. The display unit 108 may be used as an input device when including a touch input device and being applied to a touch type portable terminal.

With continued reference to FIG. 1, the communication unit 110 transmits and receives a Radio Frequency (RF) signal of data that is input and output through an antenna 111. For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data. Further, according to the present invention, the communication unit 110 transmits a data packet necessary to determine a network connection status together with a message (e.g., a location registration message) necessarily transmitted in the portable terminal. Other communication protocols may also be used.

Although the functions of the transmission time determination unit 102 can be performed by the controller 100 of the portable terminal, these elements are separately constructed in drawings the present invention for exemplary purposes only. Thus, those ordinary skilled in the art can understand that various modifications can be made within the scope of the present invention. For example, these elements may be constructed such that both their functions are processed by the controller 100.

An apparatus for decreasing the number of bearer connections by transmitting a data packet in order to determine a network connection status at a time of bearer connection is performed by a portable terminal together with a location registration message and thus for reducing battery consumption in the portable terminal has been described above. In the following description, a method of decreasing the number of bearer connections by transmitting a data packet in order to determine a network connection status at a time of bearer connection necessarily performed by a portable terminal together with a location registration message and thus for reducing battery consumption in the portable terminal will now be described by using the above apparatus according to exemplary embodiments of the present invention.

Figure 2:
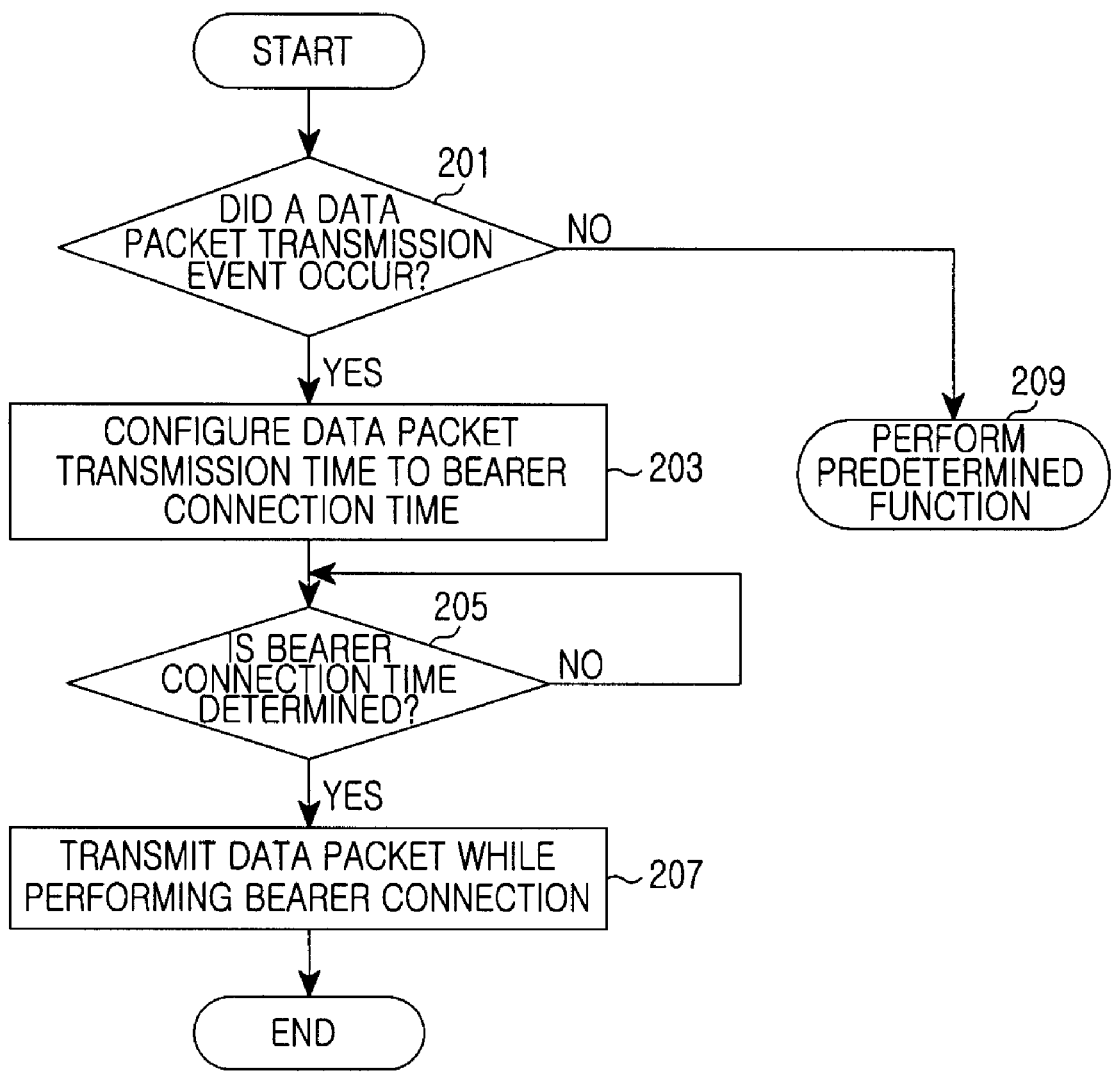
FIG. 2 is a flowchart illustrating an exemplary operational process of transmitting a data packet necessary to determine a network connection status in a portable terminal according to an exemplary embodiment of the present invention.

FIG. 2 is a flowchart illustrating an exemplary operational process of transmitting a data packet necessary to determine a network connection status in a portable terminal according to an exemplary embodiment of the present invention.

Referring now to FIG. 2, at step 201 the portable terminal determines whether or not a data packet transmission event occurs. The data packet transmission event refers to an event in which a heartbeat or ping message is periodically transmitted to a server to report that the portable terminal is connected to an IP network, and may be an execution of a service that requires a network connection.

If it is determined in step 201 that the data packet transmission event did not occur, then proceeding to step 209, the portable terminal performs a predetermined function (e.g., may go into a standby mode).

However, if it is determined in step 201 that the data packet transmission event occurs, then proceeding to step 203, the portable terminal configures a transmission time of the periodically transmitted data packet, i.e., the heartbeat or ping message periodically transmitted to determine the network connection, to a bearer connection time.

More particularly, the portable terminal of the present invention allows the data packet to be transmitted at a time of bearer configuration for transmission of a Location Area Update (LAU) or a Routing Area Update (RAU), and thus decreases the number of bearer connections caused by persistent data packet transmission, thereby reducing battery consumption.

With continued reference to FIG. 2, in step 205, the portable terminal decides if it is the bearer connection time in order to ascertain whether to perform a bearer connection function.

If it is determined in step 205 that it is not the bearer connection time, step 205 is repeated.

However, if it is determined in step 205 that it is the bearer connection time, proceeding to step 207, the portable terminal allows the data packet to be transmitted while performing the bearer connection function. That is, the portable terminal transmits the data packet at the time of the bearer connection for transmitting the LAU or the RAU. Thus, this exemplary embodiment of the present invention overcomes a known problem associated with configuring a transmission bearer to periodically transmit the data packet in the conventional portable terminal, thereby reducing battery consumption.

Thereafter, the procedure of FIG. 2 ends.

Figure 3:
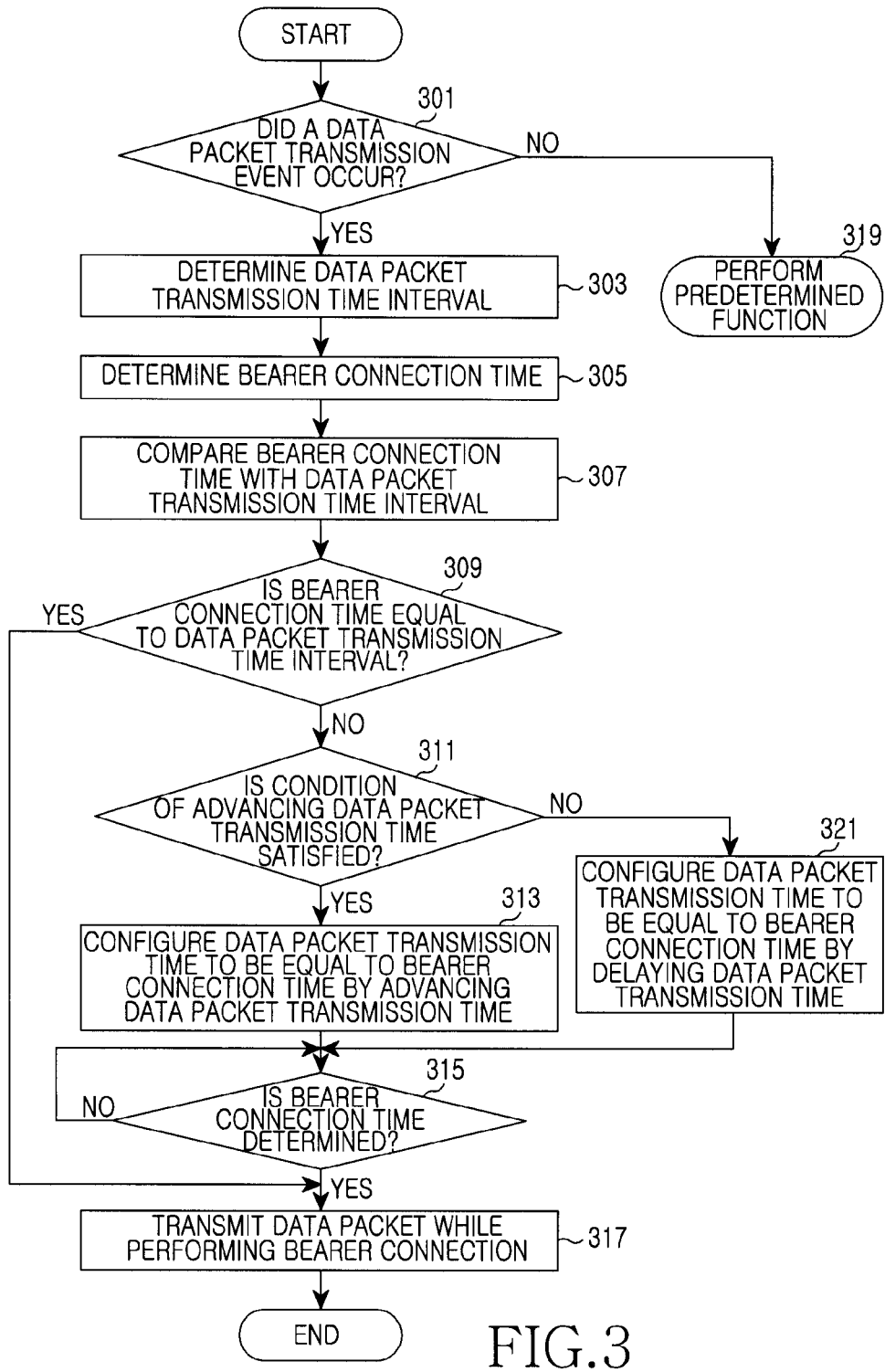
FIG. 3 is a flowchart illustrating an exemplary operational process of transmitting a data packet to determine a network connection status in a portable terminal according to another exemplary embodiment of the present invention.

FIG. 3 is a flowchart illustrating another exemplary operational process of transmitting a data packet for determining a network connection status in a portable terminal according to another exemplary embodiment of the present invention.

Referring now to FIG. 3, in step 301 the portable terminal determines whether a data packet transmission event has occurred. The data packet transmission event refers to an event in which a heartbeat or ping message is periodically transmitted to a server to report that the portable terminal is connected to an IP network.

If it is determined in step 301 that the data packet transmission event did not occur, then proceeding to step 319, the portable terminal performs a predetermined function (e.g., goes into a standby mode).

Otherwise, if it is determined in step 301 that the data packet transmission event occurs, then in step 303 the portable terminal determines a data packet transmission time interval. Thereafter at step 305 a bearer connection time is determined.

In step 307, the portable terminal compares the bearer connection time with the data packet transmission time interval. In step 309, the portable terminal determines whether or not the bearer connection time is equal to the data packet transmission time according to the comparison result of step 307.

If it is determined in step 309 that the bearer connection time is equal to the data packet transmission time interval, which means if it is determined that the data packet transmission time interval is included in a time of bearer configuration for transmission of an LAU or an RAU, then proceeding to step 317, the portable terminal allows the data packet to be transmitted while performing the bearer connection.

However, if it is determined in step 309 that the bearer connection time is different from the data packet transmission time interval, then proceeding to step 311, the portable terminal determines whether or not to advance or delay the data packet transmission time by using the bearer connection time and the data packet transmission time.

If it is determined in step 311 that a condition of advancing the data packet transmission time is satisfied, then proceeding to step 313, the portable terminal advances the data packet transmission time so that the data packet transmission time is equal to the bearer connection time. Otherwise, if it is determined in step 311 that the condition of advancing the data packet transmission time is not satisfied (i.e. the condition of delaying the data packet transmission time is satisfied), then proceeding to step 321, the portable terminal delays (configures) the data packet transmission time so that the data packet transmission time is equal to the bearer connection time.

After configuring the data packet transmission time to be equal to the bearer connection time at step 321, then proceeding to step 315, the portable terminal determines whether it is the bearer connection time to decide whether or not to perform a bearer connection.

If it is determined in step 315 that it is not the bearer connection time, step 315 is repeated.

However, if it is determined in step 315 that it is the bearer connection time, proceeding to step 317, the portable terminal allows the data packet to be transmitted while performing bearer connection. More particularly, the portable terminal transmits the data packet at the time of bearer connection for transmitting the LAU or the RAU. Thus according to the exemplary operational process illustrated by the flowchart in FIG. 3, according to this exemplary embodiment of the present invention the data packet transmission time can be configured to be either advanced or delayed so as to be equal to the bearer connection time. Accordingly, this exemplary embodiment of the present invention overcomes a known problem of configuring a transmission bearer to periodically transmit the data packet in the conventional portable terminal, and thereby reduces the battery consumption expended in the conventional portable terminal.

Thereafter, the procedure of FIG. 3 ends.

FIGS. 4A and 4B illustrate a process of changing a time of transmitting a data packet necessary to determine a network connection status in a portable terminal according to an exemplary embodiment of the present invention.

The portable terminal performs a process of decreasing the number of bearer connections by transmitting the data packet during a process of bearer connection for transmitting an LAU or an RAU. This process according to the present invention reduces battery consumption associated with a bearer connection being periodically performed to transmit a data packet such as a heartbeat or ping message in a periodic manner to a server in order to report that the portable terminal is connected to an IP network.

FIG. 4A illustrates a process of advancing a time of transmitting a data packet in a portable terminal according to an exemplary embodiment of the present invention.

Referring now to FIG. 4A, the portable terminal transmits a data packet with a period of a time T, and predicts a time of automatically performing bearer connection for transmission of an LAU or an RAU before transmission of the data packet.

Thereafter, the portable terminal compares the data packet transmission period with the time of automatically performing bearer connection.

If a remaining time $\Delta$, which is a time remaining until the time of automatically performing bearer connection, exceeds a half of the data packet transmission period time and is included in a range not exceeding a next data packet transmission period (i.e., $T/2<\Delta<T$), the portable terminal transmits the data packet by advancing a data packet transmission time 401 to a bearer connection time at which bear connection is necessarily performed, and thereafter transmits the data packet with the period of the time T from the data packet transmission time.

FIG. 4B illustrates a process of delaying a time of transmitting a data packet in a portable terminal according to an exemplary embodiment of the present invention.

Referring now to FIG. 4B, the portable terminal transmits a data packet with a period of a time T as described above, and predicts a time of automatically performing bearer connection for transmission of an LAU or an RAU before transmission of the data packet.

Thereafter, the portable terminal compares the data packet transmission time interval with the time of automatically performing bearer connection.

If a remaining time $\Delta$, which is a time until the time of automatically performing bearer connection, is not included in a range capable of advancing the transmission time as shown in FIG. 4A, for example, if the remaining time $\Delta$ does not exceed a half of the data packet transmission period time (i.e., $\Delta<T/2$), the portable terminal transmits the data packet by delaying a data packet transmission time 411 to a bearer connection time at which bear connection is necessarily performed, and thereafter transmits the data packet with the period of the time T from the data packet transmission time.

Although it is illustrated in FIG. 4 that the portable terminal advances or delays the data packet transmission time to the bearer connection time at which bearer connection is necessarily performed, a criterion for reconfiguring the data packet transmission time may change to suit particular needs.

According to exemplary embodiments of the present invention, in order to reduce battery consumption caused by bearer configuration for periodically transmitting a data packet typically required for determining a network connection status, the data packet is transmitted at a time of bearer connection necessarily performed by a portable terminal together with a location registration message, thereby reducing battery consumption in the portable terminal.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. An apparatus for identifying a network connection status in a portable terminal, the apparatus comprising:
a transmission time determination unit for determining a bearer connection time of a first data packet at which the bearer connection is performed by the portable terminal, and for reconfiguring a transmission time of a second data packet at which the second data packet is transmitted to determine the network connection status to correspond to the determined bearer connection time; and
a controller for providing control to transmit the second data packet while connecting the bearer at the reconfigured second data packet transmission time.

2. The apparatus of claim 1, wherein the first data packet is comprised of a Location Area Update (LAU) or a Routing Area Update (RAU).

3. The apparatus of claim 1, wherein the second data packet is a keep-alive packet comprising a heartbeat or ping.

4. The apparatus of claim 1, wherein the transmission time determination unit determines the bearer connection time by predicting the time that the bearer connection is to be performed when the second data packet is transmitted, and the transmission time determination unit changes the second data packet transmission time by comparing a remaining time until the bearer connection time occurs with a duration of a second data packet transmission period of the second data packet.

5. The apparatus of claim 4, wherein, if the remaining time until the bearer connection time occurs is less than a half of the second data packet transmission period, the transmission time determination unit delays the second data packet transmission time to correspond to the bearer connection time, and thereafter transmits the second data packet at the bearer connection time.

6. The apparatus of claim 4, wherein, if the remaining time until the bearer connection time occurs is greater than a half of the second data packet transmission period, the transmission time determination unit shortens the second data packet transmission time of the second data packet to be transmitted to the bearer connection time, and thereafter transmits the second data packet or a subsequent data packet at the bearer connection time.

7. The apparatus of claim 1, wherein the bearer connection time comprises a time of bearer connection for transmitting a message of a location registration process.

8. The apparatus of claim 1, wherein a number of bearer configurations is reduced by changing the second data packet transmission time.

9. The apparatus of claim 8, wherein battery consumption of the portable terminal is reduced by changing the second data packet transmission time.

10. A method of identifying a network connection in a portable terminal, the method comprising:
   determining a bearer connection time of a first data packet to be a time of a bearer connection performed by the portable terminal when a second data packet is transmitted to determine a network connection status;
   reconfiguring the second data packet transmission time to be the determined bearer connection time; and
   transmitting the second data packet while connecting the bearer at the reconfigured second data packet transmission time.

11. The method of claim 10, wherein the first data packet is comprised of a Location Area Update (LAU) or a Routing Area Update (RAU).

12. The method of claim 10, wherein the second data packet is a keep-alive packet comprising a heartbeat or ping.

13. The method of claim 10, wherein the step of determining the bearer connection time comprises:
   predicting the bearer connection time to be the time that the bearer connection is to be performed when the second data packet is transmitted; and
   wherein the step of reconfiguring includes:
   changing the second data packet transmission time by comparing a remaining time until the bearer connection time occurs with a duration of a second data packet transmission period of the second data packet.

14. The method of claim 13, wherein the reconfiguring of the second data packet transmission time to the bearer connection time performed by the portable terminal comprises, if the remaining time until the bearer connection time occurs is less than a half of the second data packet transmission period, delaying a transmission time of the second data packet to be transmitted to correspond to the bearer connection time, and thereafter transmitting the second data packet or a subsequent data packet at the bearer connection time.

15. The method of claim 13, wherein the reconfiguring of the data packet transmission time to the time of bearer connection necessarily performed by the portable terminal comprises, if the remaining time until the bearer connection time occurs is greater than a half of the second data packet transmission period, shortening a transmission time of the second data packet to be transmitted correspond to the bearer connection time, and thereafter transmitting the second data packet or a subsequent data packet at the bearer connection time.

16. The method of claim 10, wherein the bearer connection time comprises a time of bearer connection for transmitting a message of a location registration process.

17. The method of claim 10, wherein a number of bearer configurations is reduced by changing the second data packet transmission time.

18. The method of claim 17, wherein battery consumption of the portable terminal is reduced by changing the second data packet transmission time.

19. A method of identifying a network connection in a portable terminal, the method comprising:
   predicting a bearer connection time of a first data packet to be a time of a bearer connection performed by the portable terminal when a second data packet is transmitted to determine a network connection status;
   reconfiguring the second data packet transmission time to be the bearer connection time; and
   transmitting the second data packet while connecting the bearer at the reconfigured second data packet transmission time.

20. The method of claim 19, wherein the reconfiguring of the second data packet transmission time to the bearer connection time performed by the portable terminal comprises, if the remaining time until the bearer connection time occurs is less than a half of the second data packet transmission period, delaying a transmission time of the second data packet to be transmitted to correspond to the bearer connection time, and thereafter transmitting the second data packet or a subsequent data packet at the bearer connection time.

* * * * *